(12) United States Patent
Martini

(10) Patent No.: US 9,130,996 B1
(45) Date of Patent: Sep. 8, 2015

(54) NETWORK NOTIFICATIONS

(71) Applicant: Phantom Technologies, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

(21) Appl. No.: 14/226,582

(22) Filed: Mar. 26, 2014

(51) Int. Cl.
*G06F 17/00* (2006.01)
*H04L 29/06* (2006.01)

(52) U.S. Cl.
CPC ........................................ *H04L 63/20* (2013.01)

(58) Field of Classification Search
CPC ..... H04L 63/20; H04L 63/10; H04L 63/0227; H04L 47/20; H04L 63/0281; H04L 29/06; G06F 21/00; G06F 21/60
USPC .......................................................... 726/1–2
See application file for complete search history.

(56) References Cited

U.S. PATENT DOCUMENTS

| | | | |
|---|---|---|---|
| 5,835,726 A | 11/1998 | Shwed et al. | |
| 6,594,682 B2 | 7/2003 | Peterson et al. | |
| 6,742,047 B1 | 5/2004 | Tso | |
| 7,395,424 B2 | 7/2008 | Ashley et al. | |
| 7,516,485 B1 | 4/2009 | Lee et al. | |
| 7,574,738 B2 | 8/2009 | Daude et al. | |
| 7,761,594 B1 * | 7/2010 | Mowat ............................ | 709/238 |
| 7,793,342 B1 | 9/2010 | Ebrahimi et al. | |
| 7,810,160 B2 | 10/2010 | Dougherty et al. | |
| 7,945,779 B2 | 5/2011 | Martin | |
| 8,046,495 B2 | 10/2011 | Cooper et al. | |
| 8,225,085 B2 | 7/2012 | Karandikar | |
| 8,230,506 B1 | 7/2012 | Forristal | |
| 8,527,631 B1 | 9/2013 | Liang | |
| 8,590,032 B2 | 11/2013 | Hopen et al. | |
| 8,910,263 B1 | 12/2014 | Martini | |
| 2002/0114453 A1 | 8/2002 | Bartholet et al. | |
| 2002/0178381 A1 | 11/2002 | Lee et al. | |
| 2003/0105981 A1 | 6/2003 | Miller et al. | |
| 2003/0131259 A1 * | 7/2003 | Barton et al. ................. | 713/201 |
| 2004/0225895 A1 | 11/2004 | Mukherjee et al. | |
| 2008/0040790 A1 | 2/2008 | Kuo | |
| 2008/0070573 A1 | 3/2008 | Dutta et al. | |
| 2008/0128495 A1 | 6/2008 | Weintraub et al. | |
| 2008/0163333 A1 | 7/2008 | Kasralikar | |
| 2009/0193513 A1 | 7/2009 | Agarwal et al. | |
| 2009/0254990 A1 | 10/2009 | McGee | |
| 2010/0132009 A1 * | 5/2010 | Khemani et al. ................. | 726/1 |
| 2010/0138910 A1 | 6/2010 | Aldor et al. | |
| 2010/0218248 A1 * | 8/2010 | Nice et al. ....................... | 726/12 |

(Continued)

OTHER PUBLICATIONS

Acharya et al., "MPLS-based Request Routing", Jun. 10, 2001. Downloaded from the internet at: http://www.inf.fu-berlin.de/lehre/SS03/19531-V/lecture9.pdf, on Apr. 4, 2013, 9 pages.

(Continued)

*Primary Examiner* — Fikremariam A Yalew
(74) *Attorney, Agent, or Firm* — Fish & Richardson P.C.

(57) ABSTRACT

A request is received from a device within a network for a resource on server outside of the network. The resource is subject to a policy of the network. An informational webpage is served to the device; the webpage includes an interface element. An indication of a selection of the interface element is received the resource is served to the device from a proxy server configured to apply the policy to the resource.

25 Claims, 5 Drawing Sheets

(56) References Cited

U.S. PATENT DOCUMENTS

| | | | |
|---|---|---|---|
| 2011/0083154 A1 | 4/2011 | Boersma | |
| 2011/0167470 A1* | 7/2011 | Walker et al. | 726/1 |
| 2013/0117400 A1 | 5/2013 | An et al. | |
| 2013/0268666 A1 | 10/2013 | Wilson et al. | |
| 2013/0340031 A1 | 12/2013 | Amit et al. | |
| 2014/0095865 A1* | 4/2014 | Yerra et al. | 713/156 |
| 2014/0351573 A1 | 11/2014 | Martini | |

OTHER PUBLICATIONS

Big-IP, "BIG-IP® Solutions Guide, Version 4.2", 2002, downloaded from the internet at http://support.f5.com/content/kb/en-us/archived_products/big-ip/manuals/product/bag42/_jcr_content/pdfAttach/download/file.res/BIG-IP_Controller_Solutions_Guide%2c_version_4.2.pdf on Apr. 4, 2013, 214 pages.

Blue Coat White Paper (How to Gain Visibility and Control of Encrypted SSL Web Sessions), 2007, downloaded from the internet at: https://www.bluecoat.com/sites/default/files/documents/files/How_to_Gain_Visibility_and_Control_of_Encrypted_SSL_Web_Sessions.a.pdf on Dec. 10, 2013, 13 pages.

Burkholder, "SSL Man-in-the-Middle-Attacks," *Reading Room SANS*, 2002, downloaded from the internet at: http://www.sans.org/reading_room/whitepapers/threats/ssl-man-in-the-middle-attacks_480, on May 16, 2013, 17 pages.

Faruque, "Open Source Open Standard", Sep. 28, 2012, downloaded from the internet at: http://tektab.com/2012/09/28/squid-transparent-proxy-for-https-ssl-traffic/ on Apr. 26, 2013 5 pages.

Glype.com, "Glype Proxy Script", May 3, 2013, downloaded from the internet at http://www.glype.com/ on May 3, 2013, 2 pages.

Google, "The Site's Security Certificate is not Trusted", downloaded from the internet at https://support.google.com/chrome/answer/98884?hl=en on Oct. 29, 2013, 2 pages.

Molnar, "How to set up OpenDNS for content filtering, visited sites log, etc.," Jun. 22, 2011, downloaded from the internet at: http://www.hotspotsystem.com/hotspot_help/kb/articles/113-how-to-set-up-opendns-for-content-filtering-visited-sites-log-etc on May 3, 2013 7 pages.

Murdoch, et al. "Tools and Technology of Internet Filtering," Dec. 2011, http://oni-access.net/wp-content/uploads/2011/12/accessdenied-chapter-3.pdf, on May 16, 2013, 16 pages.

Nayak et al. "Different Flavours of Man-In-The-Middle Attack, Consequences and Feasible Solutions", $3^{rd}$ IEEE International Conference on Computer Science and Information Technology (ICCSIT), Jul. 9-10, 2010, pp. 491-495.

Portswigger, Ltd. "Burp Proxy Options", Apr. 26, 2013, downloaded from the internet at: http://portswigger.net/burp/help/proxy_options.html#listerners_cert on Apr. 26, 2013, 4 pages.

Portswigger, Ltd. "Getting Started with Burp Suite", Apr. 26, 2013, downloaded from the internet at: http://portswigger.et/burp/help/suite_gettingstarted.html, on Apr. 26, 2013, 4 pages.

Proxy.appspot.com, "My Proxy Server", Apr. 26, 2013, downloaded from the internet at: http://mvv-proxy.appspot.com/ on Apr. 26, 2013, 1 page.

Rousskov , "Feature: Squid-in-the-middle SSL Bump," Apr. 20, 2012, downloaded from the internet at: http://wiki.squid-cache.org/Features/SslBump on Apr. 26, 2013, 2 pages.

Ryan, "URL vs URI vs URN: The Confusion Continues", Jan. 18, 2011, downloaded from the internet at: http://damnhandy.com/2011/01/18/url-vs-uri-vs-urn-the-confusion-continues/ on Dec. 10, 2013, 7 pages.

Security Stack Exchange, "How do I check that I have a direct SSL connection to a website?" May 7, 2012, downloaded from the internet at: http://security.stackexchange.com/questions/14676/how-do-i-check-that-i-have-a-direct-ssl-connection-to-a-website on Apr. 26, 2013, 2 pages.

vonRandow, "SSL Proxying", Apr. 26, 2013, downloaded from the internet at: http://www.charlesproxy.com/documentation/proxying/ssl-proxying/ on Apr. 26, 2013, 2 pages.

Websense, Inc., "DNS Proxy Caching", 2011, downloaded from the internet at http://www.websense.com/content/support/library/web/v76/wcg_help/dns_proxy_caching.aspx on Apr. 4, 2013, 2 pages.

International Search Report issued in corresponding PCT application No. PCT/US2015/022549 dated Jun. 26, 2015, 14 pages.

\* cited by examiner

NETWORK NOTIFICATIONS

The present document relates to computer networking.

BACKGROUND

A computer network is a collection of computers and other hardware interconnected by communication channels that allow sharing of resources and information. Communication protocols define the rules and data formats for exchanging information in a computer network. Computer networks can be logically divided into subnetworks, sometimes called subnets. The subnets of a computer network, and the machines on the subnets, may all share the same hardware resources, but may have differ permissions and policies, depending on the subnet.

SUMMARY

In one aspect, a method performed by data apparatus, the method includes receiving, from a device within a network, a request for a resource from a server outside of the network. The method further includes determining that the resource is subject to a policy of the network. The method further includes serving, to the device and responsive to determining that the resource is subject to a policy of the network, an informational webpage that includes an interface element. The method further includes receiving, from the device within the network, an indication of a selection of the interface element. The method further includes serving, to the device within the network, the resource from a proxy server configured to apply the policy to the resource.

Implementations can include any, all, or none of the following features. The informational webpage further includes text informing a reader that the requested webpage is subject to the policy of the network. The informational webpage further includes instructions to install a certificate on the device within the network. The method including determining a browser that generated the request for a resource; and wherein the instructions to install a certificate on the device within the network are specific to the determined browser. The method including determining an operating system that generated the request for a resource; and wherein the instructions to install a certificate on the device within the network are specific to the determined operating system. The informational webpage further includes a second interface element to ignore future informational webpages. The method including determining that the policy specifies that the resource should be served by the proxy server. The network is associated with a domain and wherein serving the resource from the proxy server includes serving a certificate issued by the domain. The device within the network is not configured to recognize certificates issued by the domain. The method including modifying the resource before serving the resource from the proxy server. The method including logging interactions between the device and the resource. The proxy server is a first network gateway. The request for a resource from a server outside of the network is received at a second network gateway.

In one aspect, a system includes one or more processors configured to execute computer program instructions. The system further includes computer storage media encoded with computer program instructions that, when executed by one or more processors, cause a computer device to perform operations includes receiving, from a device within a network, a request for a resource from a server outside of the network. The operations further include determining that the resource is subject to a policy of the network. The operations further include serving, to the device and responsive to determining that the resource is subject to a policy of the network, an informational webpage that includes an interface element. The operations further include receiving, from the device within the network, an indication of a selection of the interface element. The operations further include serving, to the device within the network, the resource from a proxy server configured to apply the policy to the resource.

Implementations can include any, all, or none of the following features. The network is associated with a domain and wherein serving the resource from the proxy server includes serving a certificate issued by the domain. The device within the network is not configured to recognize certificates issued by the domain. The proxy server is a first network gateway. The informational webpage further includes text informing a reader that the requested webpage is subject to the policy of the network.

In one aspect, a computer storage media encoded with computer program instructions that, when executed by one or more processors, cause a computer device to perform operations includes receiving, from a device within a network, a request for a resource from a server outside of the network. The operations further include determining that the resource is subject to a policy of the network. The operations further include serving, to the device and responsive to determining that the resource is subject to a policy of the network, an informational webpage that includes an interface element. The operations further include receiving, from the device within the network, an indication of a selection of the interface element. The operations further include serving, to the device within the network, the resource from a proxy server configured to apply the policy to the resource.

Implementations can include any, all, or none of the following features. The informational webpage further includes text informing a reader that the requested webpage is subject to the policy of the network.

Implementations can include any, all, or none of the following features.

By tracking which clients have or have not installed a network's certificate, a network device can serve an informational webpage to client before allowing clients to connect to a webpage that will cause their browser to generate a certificate error page. This informational webpage may include texts to explain to a user why they will receive a certificate error, an interface to ignore future informational webpages, and/or instructions for installing the network's certificate on the client. By serving the informational webpage, a network administrator may effectively communicate to a user some of the actions taken by the network on the user's traffic. The network may use cookies to track which clients have installed a network's certificate. By tailoring the informational webpage to the client's system, the correct instructions to load the network's certificate may be provided to different clients.

Other features, aspects and potential advantages will be apparent from the accompanying description and figures.

DESCRIPTION OF DRAWINGS

Like reference symbols in the various drawings indicate like elements

DETAILED DESCRIPTION

A network gateway can identify network traffic that is subject to security policies and reroute that traffic through a man-in-the-middle (MitM) gateway and/or proxy server. When a client's traffic is rerouted this way, the client's traffic can be served from the MitM gateway or proxy server. If the client does not have the public key certificate of the MitM gateway or proxy server, the client's browser may produce a warning that the client's connection is not secure.

Before rerouting the traffic, the network gateway can serve, or cause to be served, an informational webpage to the client. The webpage can include text describing to the user of the client that their traffic is being rerouted or inspected. The informational webpage can also include instructions for the user on how to install the network's public key certificate in order to avoid the browsers warning. As such, a network administrator may be able to configure a network in which traffic is inspected and in which the users of the network can be informed of how and why the traffic is inspected.

Figure 1:
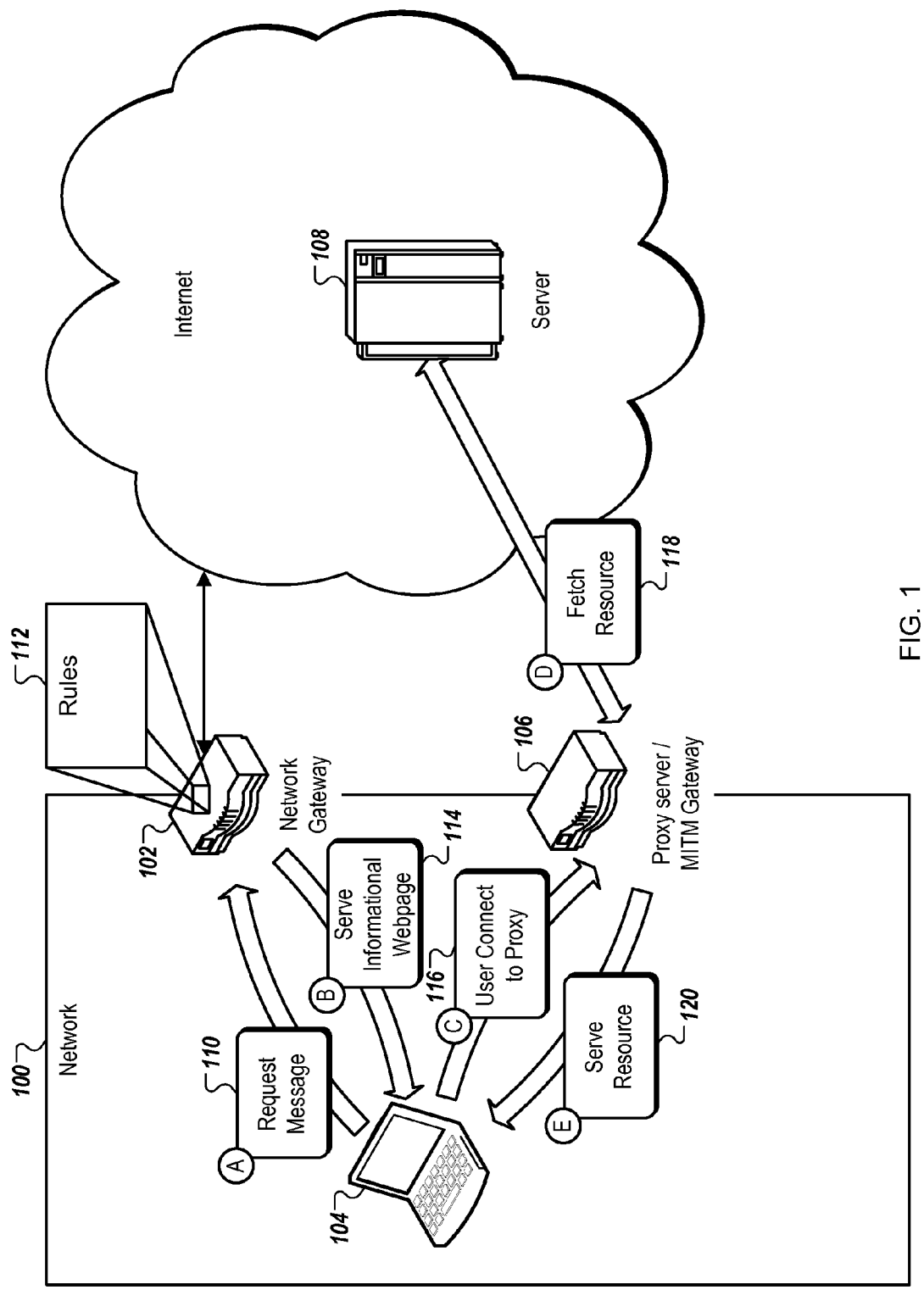
FIG. 1 is a block diagram of an example network that serves informational webpages.

FIG. 1 is a block diagram of an example network 100 that serves informational webpages. The network 100 includes a network gateway 102; a browser device 104, which can represent any appropriate computing device capable of browsing resources outside of the network 100; and a proxy server/MitM gateway 106, which can represent any appropriate type of gateway capable of acting as a MitM and/or any appropriate type of proxy server. While not shown for clarity's sake, the network 100 can include other elements such as, but not limited to, wireless and/or wired access points, file and/or application servers, routers, and network cables, as well as additional browser devices 104, network gateways 102 and/or proxy servers/MitM gateways 106.

The network 100 can be configured to route some or all of the plaintext messages addressed outside of the network to the network gateway 102. The network gateway 102 can inspect the plaintext messages and, optionally, modify or drop some messages. For example, the network gateway 102 may be configured to prevent traffic from a particular class of applications (e.g., chat, file sharing). The network gateway 102 may also be configured to intercept messages intended for a recipient outside of the network 100 and reply with, for example, a different resource and/or a redirect.

For example, the network gateway may intercept and examine a request message 110 from the browser device 104 that is addressed to a server 108. Based on, for example, the URL or the URI of the request message 108 and rules 112 indicating which destinations or content may be subject to a policy of the network 100. If the network gateway 102 determines that the request 110 requests a resource that is subject to a policy, the network gateway 102 can reroute the connection through a proxy server/MitM gateway 106.

As part of this rerouting, the network gateway 102 can determine if the browser device 104 has the public key certificate of the network 100 installed. The public key certificate of the network is generally a file or data object that binds a pubic encryption key with a particular identity that the browser device 104 would consider trusted. If the browser device 104 has the network's public key certificate, the network gateway can redirect the browser device 104 to the proxy server/MitM gateway 106. Many types of redirection are possible, including but not limited to server-side scripting, frame redirects, and Apache mod_rewrite.

If the network gateway 102 determines that the browser device 104 has the public key certificate of the network 100 installed, the network gateway 102 can serve 114, or cause to be served by another server, an informational webpage. The informational webpage may include content designed to be rendered in a web browser and read by the user of the browser device 104. This content can include an explanation to the user that their traffic with the server 108 is going to be intercepted and examined as it passes into and out of the network 100. It may also include an explanation of why the traffic will be intercepted and examined (e.g., to prevent the spread of malicious programs, to prevent the transmission of sensitive data stored on the network 100, to ensure that the user uses the browser device 102 in accordance with an acceptable use policy, etc.) Additionally or alternatively, the informational webpage may include instructions for installing the public key certificate on the browser device 104.

The informational webpage may also include a link to "proceed," or similar, that will allow the browser device 104 to connect 116 to the proxy server/MitM gateway 106 to request the resource in the original request 110.

The proxy server/MitM gateway 106 may, in response, fetch 118 the resource from the server 108. Before passing the resource to the browser device 104, the proxy server/MitM gateway 108 can inspect the resource, for example, to ensure that it complies with policies of the network 100. If the resource does comply, the proxy server/MitM gateway 106 can serve 120 the resource. Optionally, such as if the resource does not comply with the policies of the network 100, the proxy server/MitM gateway 102 can modify or drop the resource. For example, if the resource is a webpage with an embedded object known to download malicious software, the proxy server/MitM gateway 108 may drop the webpage instead of serving it, or it may modify the webpage by stripping the embedded object before serving. In addition, the proxy server/MitM gateway 106 may also monitor outbound traffic from the browser device 104 to the server 108. For example, if the network 100 has a policy preventing the exfiltration of sensitive data, the proxy server/MitM gateway 106 may drop any traffic from the browser device 104 to the server 108 that includes that sensitive data.

The components of the network may be realized in many different configurations. For example, the proxy server/MitM gateway 106 may be an off-the-shelf proxy server configured only to act as a proxy server with the functionality described in this document. In another case, the proxy server/MitM gateway 106 may be a network gateway configured to perform an array of MitM-related and non-MitM-related gateway functions. In yet another case, the proxy server/MitM gateway 106 and the network gateway 102 may be realized as a single piece of hardware that shares or has segregated processor, memory, and network connection resources. Many other configurations are possible.

Although the elements of FIG. 1 are shown in particular relationships are possible. For example, proxy server/MitM gateway 106 is shown on the edge of the network 100. However, it may be possible for the proxy server/MitM gateway 106 to be within the network 100 and to route traffic through the network 102. This may be desirable, for example, if the requirements of the network 100 limit the number of ingress and egress points on the network 100. In another example, the proxy server/MitM gateway 106 may be a service provided by unspecified number and kind of servers accessible on the Internet, that is, the proxy server/MitM gateway 106 may be a cloud service. This may be desirable, for example, if the proxy server/MitM gateway 106 is operated by a third party for the administrators of the network 100.

Figure 2:
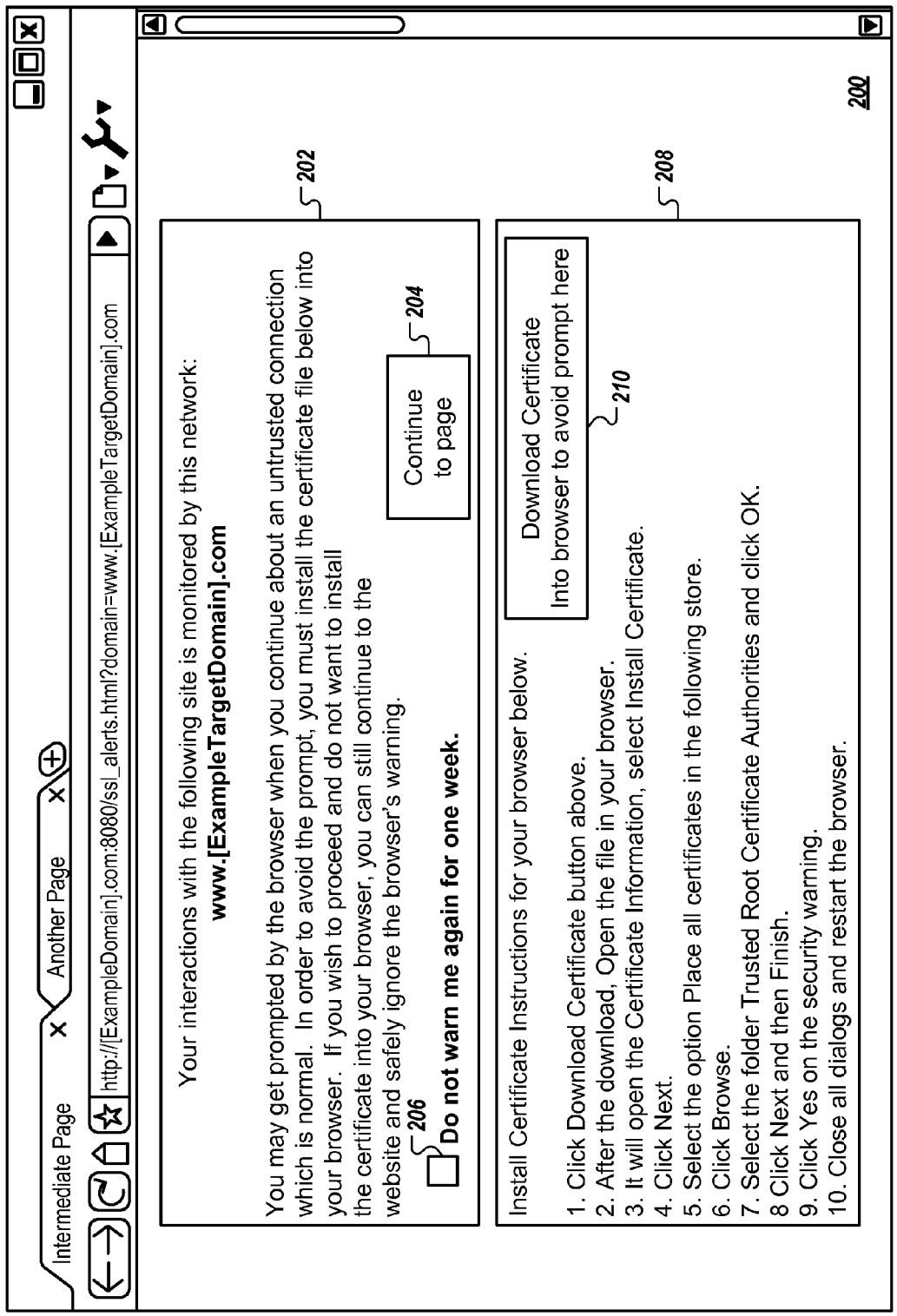
FIGS. 2 and 3 are schematic drawings of example informational webpages.
Figure 3:
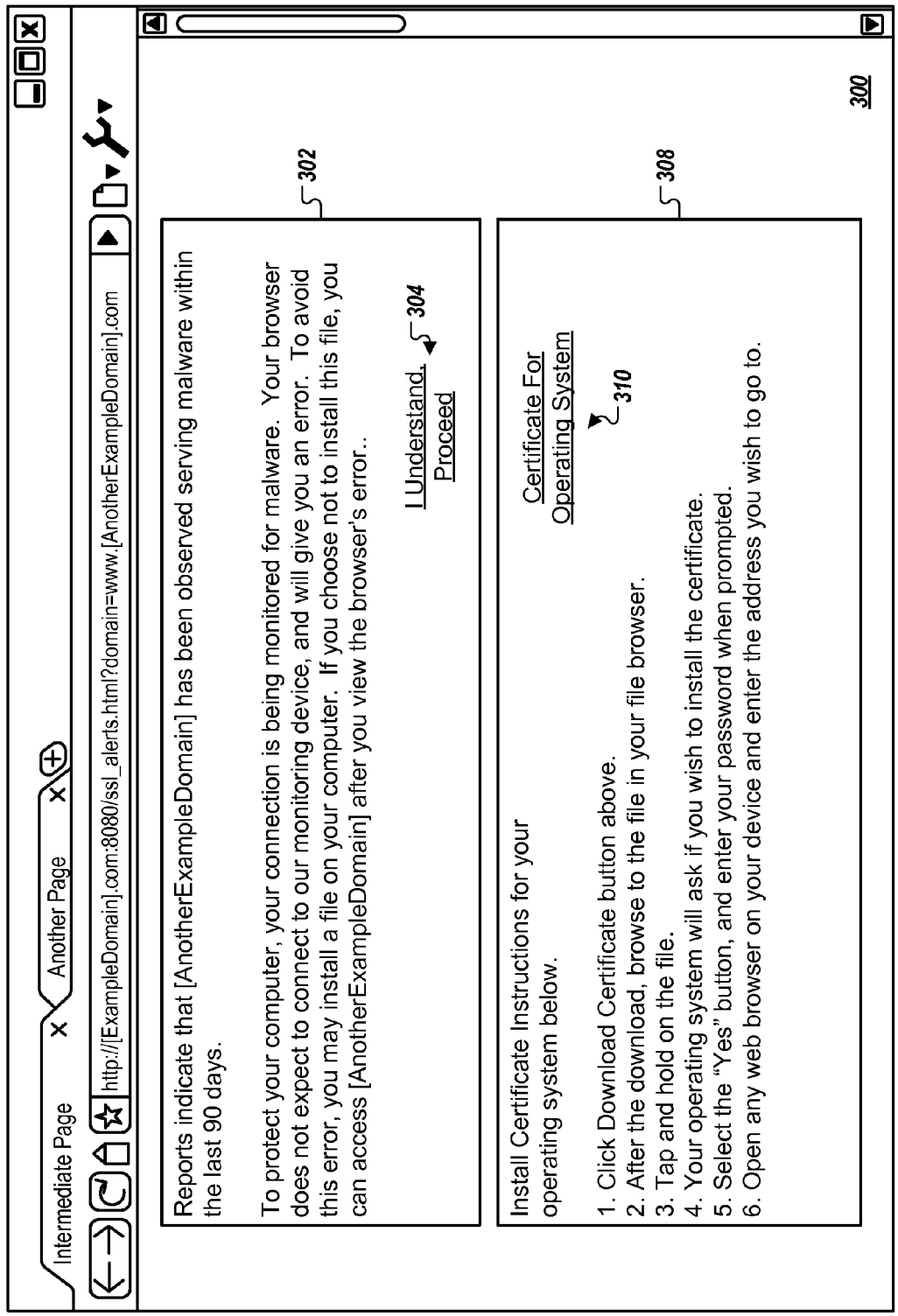

FIGS. 2 and 3 are schematic drawings of example informational webpages 200 and 300. These informational webpage may be served, for example, to the browser device 104 by the network gateway 102 or another appropriate server after determinations that i) a resource requested by the browser device 104 is subject to a policy of the network 100 and ii) the browser device 104 does not have the public key certificate of the network 100 installed.

In the examples shown, web browsers have requested webpages at the URLs "www.[ExampleTargetDomain].com" and "www.[AnotherExampleDomain].com in the web browsers 200 and 300 respectively. Instead of routing the requests for these webpages, the network hosting the browsing devices has redirected the browsers to corresponding informational websites on the [ExampleDomain] domain. The [ExampleTargetDomain] and [AnotherExampleDomain] are domains which host one or more resources that one or more policies of the network apply to. For example, a policy may call for monitoring any activity with domains on a blacklist, and the [ExampleTargetDomain] may be on that blacklist. In another example, the policy may call for monitoring all communication to filter malicious applications. The [ExampleDomain] is a domain related in some way with the network hosting the computer running the web browser. For example, it may be a domain registered with the Domain Name Service and owned by the owners of the network. Or it may be a domain owned by a manufacturer of some of the equipment that makes up the network, including but not limited to a gateway of the network.

The example webpages 200 and 300 can include sections containing text informing a reader that the requested webpage is subject a security policy of the network. For example, the informational webpage 200 can include a text box 202 that informs the user that the [ExampleTargetDomain] is monitored by the network, and if the user proceeds, their browser may prompt the user about an untrusted connection. As another example, the informational webpage 300 can include a text box 302 that informs the user that reports indicate that [AnotherExampleDomain] has been observed serving malware recently and that the browsers connection is being monitored for malware. There are many other text notifications that could be used in other informational webpages.

The example webpages can include a user interface element to continue to the requested resource. For example, the informational webpage 200 can include a button 204 with the caption "Continue to page." The button 204, when clicked, can cause the browser to create a connection with a MitM gateway, proxy server, or other device that can fetch, monitor, and serve the originally requested resource from [ExampleTargetDomain]. As another example, the informational webpage 300 can include a link 310 with the text "I Understand, Proceed." The link 310, when selected, can cause the browser to create a connection with a MitM gateway, proxy server, or other device that can fetch, monitor, and serve the originally requested resource from [AnotherExampleDomain]. In some cases, the interface element may reference the original target webpage (e.g., a link may have the address "http://[ExampleTargetDomain].com" or "https:/[ExampleTargetDomain.com].com), the address of an element on the network (e.g., a proxy server's address), a script or application, or any other appropriate asset.

In some cases, the informational webpages may include interface elements to ignore future informational webpages. For example, the informational webpage 200 includes a checkbox 206 with the label "Do not warn me again for one week." If the user selects this checkbox before selecting the button 204, the user may not receive this or similar informational webpages for one week. The presence, duration, and applicable domains for this element may be set by an administrator. For example, an administrator may configure an informational webpage to not offer this element, as shown in informational webpage 300. In other cases, the ability to ignore the warning may be limited only to a particular domain, or for different lengths of time (e.g., a day, a month, permanently).

The example webpages 200 and 300 can include a section containing instructions to install a certificate on a device. These instruction may include human-readable text intended for a user to read and understand, and/or computer-readable instructions (e.g., Hypertext Markup Language or HTML code, network addresses) intended for the browser or a computer to parse and operate on. For example, the informational webpage 200 can include a text box 208 that includes instructions for installing the network's public key certificate in the web browser displaying the informational webpage 200. The informational webpage 200 can also include a button with the caption "Download Certificate into browser to avoid prompt here." The button 210, when clicked, can cause the browser to request a download of the network's certificate. As another example, the informational webpage 300 can include a text box 308 that includes instructions for installing the network's public key certificate in the operating system hosting the web browser displaying the informational webpage 300. The informational webpage 300 can also include a link 310 with the text "Certificate For Operating System." The link 310, when clicked, can cause the browser to request a download of the network's certificate. There are many other instructions that could be used in other informational webpages.

In some cases, the informational webpages 200 and 300 may both be generated and served by the same network. For example, the network gateway 102, using information about the browser device 104 and the applicable policies, can generate informational webpages from one or more templates, according to the rules 112. Portions of the template may be filled depending on the browser device 104; the browser device's 104 operating system, web browser, or other software; the policy applicable to a request; and/or the resource being requested. The content used to fill the templates may be prepackaged with the network gateway 102 and/or set by a network administrator. For example, the network gateway 102 may have an administrative interface (e.g., webpages, not shown), where an administrator can configure the network gateway 102. As part of the configuration, the administrator may create, edit, or remove the rules 102 used to generate the informational webpages. For example, the administrator may specify the addresses at which the network's public key certificates can be found, or the administrator may specify if, and for how long, a user may ignore the informational webpages.

Figure 4:
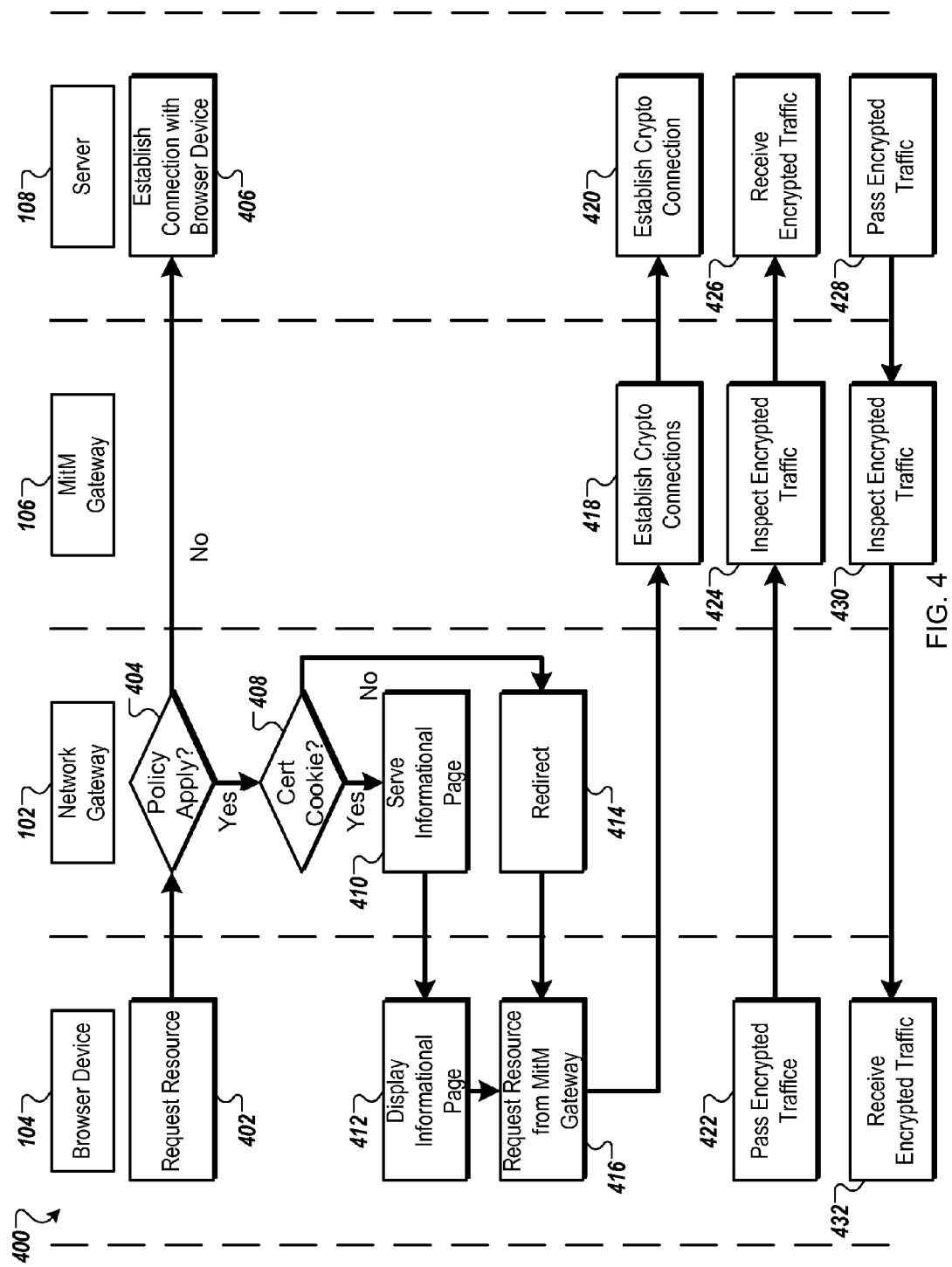
FIG. 4 is a swim-lane diagram of an example process for serving informational webpages.

FIG. 4 is a swim-lane diagram of an example process 400 for serving informational webpages. The process 400 is described with reference to the components shown in FIG. 1. However, other components can be used to perform the process 300 or a similar process.

A browser device 104 creates a request for a resource (402). For example, a user may type, into the address bar of a web browser, the unique URI of a data object hosted in a hosted storage system on the server 108. The network gateway 102 can receive the request and determine if the resource is subject to a policy of the network 100 (404). For example, the network gateway 102 can compare the request, a portion of the request, and/or something referenced by the request, to a set of business or security rules stored in the rules 112. If the request does not match a policy of the network, the network gateway 102 can pass the request to the server 108, and the server 108 and the browser device 104 can established an encrypted or unencrypted connection (406). In some, but not all, cases, the request for the resource must be in plain-text for the network gateway 102. In some, but not all, cases, the request for the resource may be encrypted with a key known to the network gateway 102.

If a policy does apply, the network gateway 102 can determine if one or more certificate cookies are stored by the browser device 104. For example, over the course of usage, the network gateway 102 may serve one or more certificate cookies to the browser device 104. In some cases, the cookie can specify that the browser device 104 does or does not have the network's 100 public key certificate installed. In some cases, the browser device 104 has previously selected to ignore informational webpages, and the network gateway 102 has served the browser device 104 a cookie to record this selection. By interrogating the browser device 104 for these cookies, the network gateway 102 can determine if an informational webpage should be served to the browser device 104.

If the network gateway 102 determines that an informational webpage should be served to the browser device 104, the network gateway 102 can serve, or cause to be served, an informational webpage to the browser device 104 (410). For example, the network gateway can issue a redirect to the browser device to a web server (not shown) on or off the network 100 to serve the informational webpage. In another example, the network gateway 102 can serve the informational webpage. The browser device 104 can receive and display the informational webpage (412). For example, the web browser on the browser device 104 can receive, parse, and render the HTML of the informational page to the user of the browser device 104. Two example informational webpages are shown as rendered in FIGS. 2 and 3. In some cases, the user of the browser device 104 may read the directions for installing the network's 100 public key certificate and chose to install the public key certificate. The particular steps for such installation often depend on, for example, at least the configuration of the browser device 104 and the network 100.

If the network gateway 102 determines that an informational webpage should not be displayed (e.g., because a cookie to ignore the informational webpage is stored in the browser device 104, because a cookie indicating that the network's 100 public key certificate is installed on the browser device 104), the network gateway 102 can issue a redirect (414). For example, either because the informational page is not needed, or because the user of the browser device has previously asserted that they do not wish to see the informational page, the network gateway 102 can redirect the browser device 104 to the MitM gateway 106.

The browser device 104 can request the resource from the MitM gateway 106 (416). For example, if the web browser of the browser device 104 had previously displayed an informational webpage, the user of the browser device 104 may have selected an interface element (e.g., the button 204) to request the resource from the MitM gateway 106. Alternatively, if the browser device 104 received a redirect to the MitM gateway 106 from the network gateway 102, the browser device 104 can follow the redirect to the MitM gateway 106.

The browser device 104 and the MitM gateway 102 establish a first encrypted connection (418). For example, the MitM gateway 106 may act as a proxy for the server 108, mimicking the interface of the server 108 in communication with the browser device 104. To establish this first encrypted connection, the browser device 104 may use the public key of the network 100's public key certificate, if it has that public key certificate installed. If the browser device 104 does not have the public key certificate of the network 100 installed, the web browser of the browser device 104 may display an error or waning to the user of the browser device 104. This error may be presented, for example, by the web browser for any certificate that is not signed by a known and trusted certificate authority, as the network's 100 public key certificate may not be. If the user of the browser device 104 has previously viewed an informational webpage, they have been informed about this warning and are likely to understand the issues and consequences of such a warning or error.

The MitM gateway 106 requests an encrypted connection with the server 108 (420). For example, the MitM gateway 108 can use the URI of the hosted data object to request the hosted data object from the server 108 on behalf of the browser device 104. This connection can be initiated with the public key certificate of the server 108, which may be distributed and signed, for example, by a known and trusted certificate authority.

With these two cryptographic connections in place, the MitM gateway 106 can function as a MitM or proxy server between the browser device 104 and the server 108. Upon creation of the two connections, the MitM gateway can fetch, from the server 108, the requested hosted data object and server, to the browser device 104, the requested data object. Further communication between the server 108 and the browser device 104 can be transacted as follows.

The browser device 104 generates traffic, encrypts the traffic into a first encrypted form, and passes the traffic to the MitM gateway 102 (422). For example, the browser device can create a HTTP Get request for another data object. The browser device can encrypt the HTTP Get request according to the requirements of the encrypted connection with the MitM gateway 102 and pass the encrypted HTTP Get request to the MitM gateway 102.

The MitM gateway 102 receives the traffic, decrypts the traffic, inspects the traffic, encrypts the traffic into a second encrypted form, and passes the traffic to the server 108 (424). For example, the MitM gateway 102 can decrypt the encrypted message into plaintext and determine that the message is an HTTP Get request. The MitM gateway 102 can compare the HTTP Get request with the rules of any policies that apply to traffic out of the network 100. If the HTTP Get request does not violate any policy, the MitM gateway 102 can encrypt the HTTP Get request according to the requirements of the encrypted connection with the server 108 and pass the encrypted HTTP Get request to the server 108. If the HTTP Get request does violate a policy, the MitM gateway 102 can modify or drop the request, as specified by the policy.

The server 108 receives the traffic in the second encrypted form (426). For example, the server 108 may receive the encrypted HTTP Get request, decrypt the HTTP Get request, and determine that the user of the browser device 104 has authorization to access the requested data object.

The server 108 generates traffic, encrypts the traffic into a third encrypted form, and passes the traffic to the MitM gateway 102 (428). For example, the server 108 can access the requested data object, format the data object into XML or other appropriate format, and add the XML object to an HTTP reply. The server 108 can encrypt the HTTP reply according to the requirements of the encrypted connection with the MitM gateway 102 and pass the encrypted HTTP reply to the MitM gateway 102

The MitM gateway 102 receives the traffic, decrypts the traffic, inspects the traffic, encrypts the traffic into a fourth form, and passes the traffic to the browser device 104 (430). For example, the MitM gateway 102 can decrypt the encrypted message into plaintext and determine that the message is an HTTP reply. The MitM gateway 102 can compare the HTTP reply with the rules of any policies that apply to traffic into the network 100. If the HTTP reply does not violate any policy, the MitM gateway 102 can encrypt the HTTP reply according to the requirements of the encrypted connection with the browser device 104 and pass the encrypted HTTP reply to the browser device 104. If the HTTP reply does violate a policy (e.g., contains malicious code, too large), the MitM gateway 102 can modify or drop the reply, as specified by the policy.

The browser device 104 receives the encrypted traffic (432). For example the browser device can decrypt the HTTP reply, extract the XML object, and store the XML object to disk.

Although a particular number, order, and type of operations are shown here, other numbers, orders, and types of operations are possible. For example, the network gateway 102 and the MitM gateway 106 may be the same hardware device. In another example, the network gateway 102 may be configured not to respect cookies indicating a preference to ignore informational webpages for particular types of resource requests.

Figure 5:
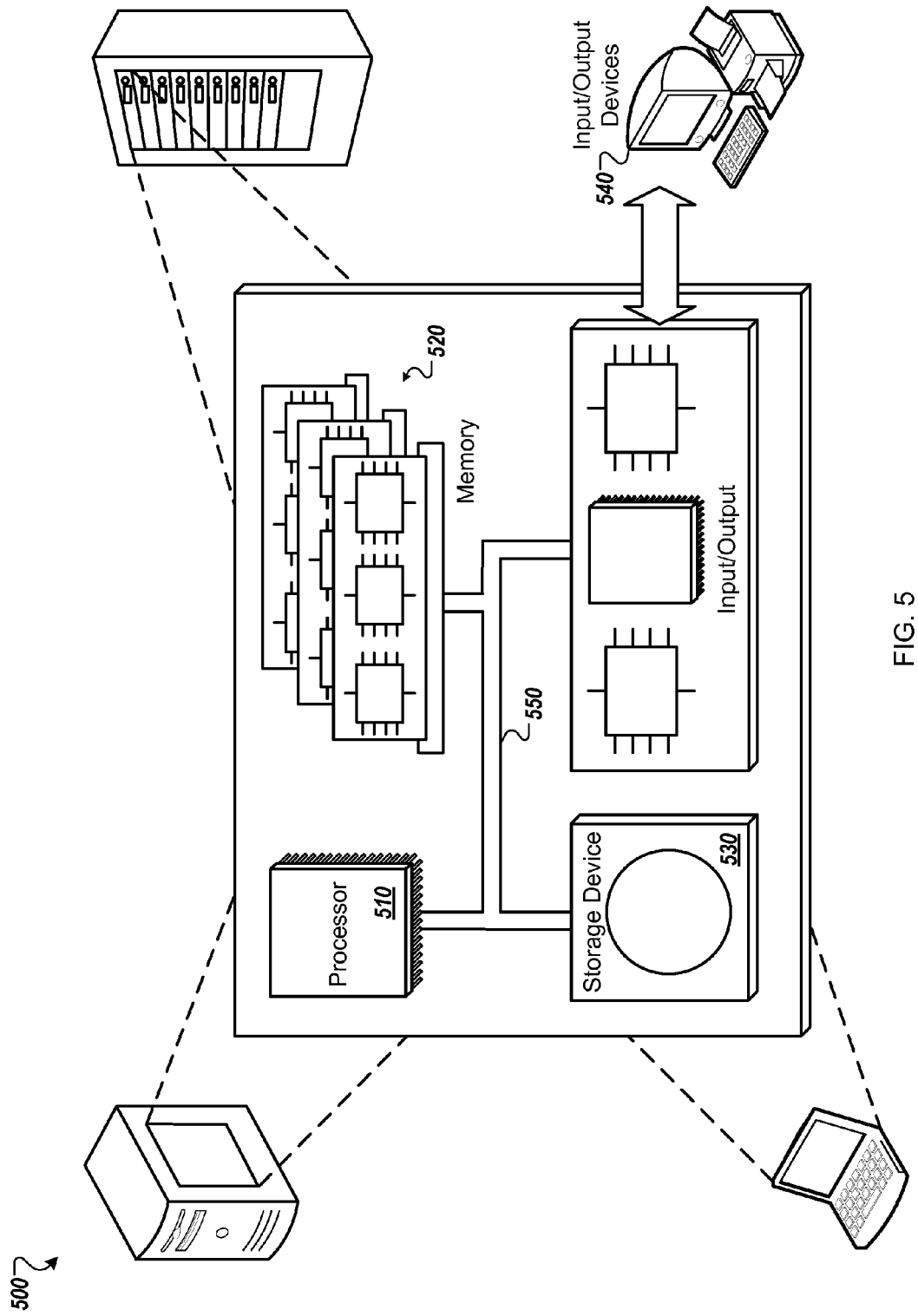
FIG. 5 is a schematic diagram that shows an example of a computing device and a mobile computing device.

FIG. 5 is a schematic diagram that shows an example of a computing system 500. The computing system 500 can be used for some or all of the operations described previously, according to some implementations. The computing system 500 includes a processor 510, a memory 520, a storage device 530, and an input/output device 540. Each of the processor 510, the memory 520, the storage device 530, and the input/output device 540 are interconnected using a system bus 550. The processor 510 is capable of processing instructions for execution within the computing system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the computing system 500. In some implementations, the memory 520 is a computer-readable medium. In some implementations, the memory 520 is a volatile memory unit. In some implementations, the memory 520 is a non-volatile memory unit.

The storage device 530 is capable of providing mass storage for the computing system 500. In some implementations, the storage device 530 is a computer-readable medium. In various different implementations, the storage device 530 may be a floppy disk device, a hard disk device, an optical disk device, or a tape device.

The input/output device 540 provides input/output operations for the computing system 500. In some implementations, the input/output device 540 includes a keyboard and/or pointing device. In some implementations, the input/output device 540 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

This document describes technologies that can be applied to a wide range of uses, which are designed and intended to be beneficial for all users involved. However, some of the technologies described may be put to illegitimate, malicious, and even illegal ends by bad actors. This is true with almost any technology, but there is often a greater sensitivity when a technology interacts with a user's security and private information. The described technologies all are designed to operate in an environment and in a manner that respects the rights of all users. As such, features such as user notification, opt-in and opt-out procedures and privacy settings are available options to be used to ensure user security and privacy are respected.

What is claimed is:

1. A method performed by data apparatus, the method comprising:
   receiving, from a device within a network, a request for a resource from a server outside of the network;
   determining that the resource is subject to a policy of the network;
   determining information about the device within the network that generated the request for the resource;
   accessing an informational webpage that is assembled to comprise instructions to install a certificate on the device within the network, wherein the certificate installation instructions assembled into the informational webpage correspond to the determined information;
   wherein the informational webpage further comprises an interface element;
   serving, to the device and responsive to determining that the resource is subject to a policy of the network, the informational webpage;
   receiving, from the device within the network, an indication of a selection of the interface element; and
   serving, to the device within the network, the resource from a proxy server configured to apply the policy to the resource.

2. The method of claim 1, wherein the informational webpage further comprises text informing a reader that the requested webpage is subject to the policy of the network.

3. The method of claim 1, wherein determining information about the device within the network that generated the request for the resource further comprises determining a browser of the device; and
   wherein the instructions to install a certificate on the device within the network are specific to the determined browser.

4. The method of claim 1, wherein determining information about the device within the network that generated the request for the resource further comprises determining an operating system of the device; and
   wherein the instructions to install a certificate on the device within the network are specific to the determined operating system.

5. The method of claim 1, wherein the informational webpage further comprises a second interface element to ignore future informational webpages.

6. The method of claim 1, the method further comprising determining that the policy specifies that the resource should be served by the proxy server.

7. The method of claim 1, wherein the network is associated with a domain and wherein serving the resource from the proxy server comprises serving a certificate issued by the domain.

8. The method of claim 7, wherein the device within the network is not configured to recognize certificates issued by the domain.

9. The method of claim 1, the method further comprising modifying the resource before serving the resource from the proxy server.

10. The method of claim 1, the method further comprising logging interactions between the device and the resource.

11. The method of claim 1, wherein the proxy server is a first network gateway.

12. The method of claim 11, wherein the request for a resource from a server outside of the network is received at a second network gateway.

13. The method of claim 1, wherein accessing a webpage that is assembled to comprise instructions to install a certificate on the device within the network comprises:
    accessing an informational webpage template that comprises one or more fillable portions;
    selecting, from a plurality of content items, one or more content items for each of the fillable portions based on the identified information; and
    filling the fillable portions with the corresponding one or more content items.

14. The method of claim 1, wherein the informational webpage is assembled in response to determining information about the device.

15. A system comprising:
    one or more processors configured to execute computer program instructions; and
    computer storage media encoded with computer program instructions that, when executed by one or more processors, cause a computer device to perform operations comprising:
      receiving, from a device within a network, a request for a resource from a server outside of the network;
      determining that the resource is subject to a policy of the network;
      determining information about the device within the network that generated the request for the resource;
      accessing an informational webpage that is assembled to comprise instructions to install a certificate on the device within the network, wherein the certificate installation instructions assembled into the informational webpage correspond to the determined information;
      wherein the informational webpage further comprises an interface element;
      serving, to the device and responsive to determining that the resource is subject to a policy of the network, the informational webpage;
      receiving, from the device within the network, an indication of a selection of the interface element; and
      serving, to the device within the network, the resource from a proxy server configured to apply the policy to the resource.

16. The system of claim 15, wherein the network is associated with a domain and wherein serving the resource from the proxy server comprises serving a certificate issued by the domain.

17. The system of claim 16, wherein the device within the network is not configured to recognize certificates issued by the domain.

18. The system of claim 15, wherein the proxy server is a first network gateway.

19. The system of claim 15, wherein the informational webpage further comprises text informing a reader that the requested webpage is subject to the policy of the network.

20. The system of claim 15, wherein accessing a webpage that is assembled to comprise instructions to install a certificate on the device within the network comprises:
    accessing an informational webpage template that comprises one or more fillable portions;

selecting, from a plurality of content items, one or more content items for each of the fillable portions based on the identified information; and filling the fillable portions with the corresponding one or more content items.

21. The system of claim 15, wherein the informational webpage is assembled in response to determining information about the device.

22. A non-transitory computer readable storage media encoded with computer program instructions that, when executed by one or more processors, cause a computer device to perform operations comprising:

receiving, from a device within a network, a request for a resource from a server outside of the network;

determining that the resource is subject to a policy of the network;

determining information about the device within the network that generated the request for the resource;

accessing an informational webpage that is assembled to comprise instructions to install a certificate on the device within the network, wherein the certificate installation instructions assembled into the informational webpage correspond to the determined information;

wherein the informational webpage further comprises an interface element;

serving, to the device and responsive to determining that the resource is subject to a policy of the network, the informational webpage;

receiving, from the device within the network, an indication of a selection of the interface element; and serving, to the device within the network, the resource from a proxy server configured to apply the policy to the resource.

23. The computer storage media of claim 22 wherein the informational webpage further comprises text informing a reader that the requested webpage is subject to the policy of the network.

24. The computer storage media of claim 22, wherein accessing a webpage that is assembled to comprise instructions to install a certificate on the device within the network comprises:

accessing an informational webpage template that comprises one or more fillable portions;

selecting, from a plurality of content items, one or more content items for each of the fillable portions based on the identified information; and filling the fillable portions with the corresponding one or more content items.

25. The computer storage media of claim 22, wherein the informational webpage is assembled in response to determining information about the device.

\* \* \* \* \*